(12) United States Patent
Gorodyansky et al.

(10) Patent No.: US 7,693,872 B2
(45) Date of Patent: Apr. 6, 2010

(54) SOFTWARE WEB CROWLER AND METHOD THEREFOR

(75) Inventors: David Gorodyansky, Sunnyvale, CA (US); Eugene Malobrodsky, Cupertino, CA (US); Dimitry Gavrilov, San Francisco, CA (US)

(73) Assignee: Anchorfree, Inc., Sunnyvale, CA (US)

( * ) Notice: Subject to any disclaimer, the term of this patent is extended or adjusted under 35 U.S.C. 154(b) by 0 days.

(21) Appl. No.: 11/839,789

(22) Filed: Aug. 16, 2007

(65) Prior Publication Data

US 2008/0046240 A1 Feb. 21, 2008

Related U.S. Application Data

(60) Provisional application No. 60/838,789, filed on Aug. 17, 2006.

(51) Int. Cl.
*G06F 19/00* (2006.01)
(52) U.S. Cl. .................................................. 707/104.1
(58) Field of Classification Search ...................... 707/1
See application file for complete search history.

(56) References Cited

U.S. PATENT DOCUMENTS

| | | | | |
|---|---|---|---|---|
| 5,612,729 A | * | 3/1997 | Ellis et al. .................... 725/22 |
| 5,918,223 A | * | 6/1999 | Blum et al. ..................... 707/1 |
| 6,675,174 B1 | * | 1/2004 | Bolle et al. ............... 707/104.1 |
| 6,681,247 B1 | | 1/2004 | Payton | |
| 7,177,872 B2 | * | 2/2007 | Schwesig et al. .............. 707/10 |
| 7,194,483 B1 | * | 3/2007 | Mohan et al. ............. 707/104.1 |
| 2002/0069218 A1 | * | 6/2002 | Sull et al. ................. 707/501.1 |
| 2002/0099731 A1 | * | 7/2002 | Abajian ...................... 707/500 |
| 2003/0023421 A1 | | 1/2003 | Finn et al. | |
| 2003/0187820 A1 | * | 10/2003 | Kohut et al. .................... 707/1 |
| 2005/0086254 A1 | * | 4/2005 | Zou et al. .................... 707/102 |
| 2005/0091274 A1 | * | 4/2005 | Stanford .................. 707/104.1 |
| 2005/0108001 A1 | * | 5/2005 | Aarskog ...................... 704/10 |
| 2005/0222981 A1 | | 10/2005 | Lawrence et al. | |
| 2005/0234779 A1 | * | 10/2005 | Chiu et al. .................... 705/24 |
| 2006/0268667 A1 | * | 11/2006 | Jellison et al. ........... 369/30.08 |
| 2007/0033228 A1 | | 2/2007 | Fasset et al. | |
| 2007/0038567 A1 | * | 2/2007 | Allaire et al. ................. 705/50 |
| 2007/0106693 A1 | * | 5/2007 | Houh et al. ............. 707/104.1 |
| 2008/0229374 A1 | * | 9/2008 | Mick et al. ..................... 725/93 |

OTHER PUBLICATIONS

A Review of Algorithms for Audio Fingerprinting (P. Cano et al. In International Workshop on Multimedia Signal Processing, US Virgin Islands, Dec. 2002).*
Kurt Rosenfeld, Audio, http://w140.com/audio/ (vistied on Jun. 12, 2008).*
International Search Report dated Jun. 19, 2008 for International Application No. PCT/U507/18190.

* cited by examiner

*Primary Examiner*—Charles Rones
*Assistant Examiner*—Kurt Mueller
(74) *Attorney, Agent, or Firm*—Haynes and Boone, LLP; Pavel I. Pogodin

(57) ABSTRACT

System for crawling the web for multimedia files and indexing the files based on sound analysis and algorithmic translation.

10 Claims, 2 Drawing Sheets

SOFTWARE WEB CROWLER AND METHOD THEREFOR

CROSS-REFERENCE TO RELATED APPLICATION

This application claims the benefit of priority to U.S. Provisional Patent Application No. 60/838,789 filed on Aug. 17, 2006, which is incorporated by reference in its entirety for all purposes as if fully set forth herein.

DESCRIPTION OF THE INVENTION

1. Field of the Invention

The present invention relates generally to Internet technology and more specifically to techniques for generating indexed representation of information available on a computer network such as Internet.

2. Description of the Related Art

The existing web crawlers are only capable of searching for audio/video (media) files based on human generated description of the file. For example, a listener may label a song with keywords "Rock" or "Tango", which can be appended to the appropriate file names. The existing web crawlers rely on these keywords to determine and index the audio/video files.

The main drawback of the aforesaid conventional crawling technique is that it heavily depends on the human generated descriptions of the media files. If the human-rendered descriptions associated with the media files are missing or inaccurate, the existing systems are unable to classify and/or index such files.

Therefore, what is needed is a technique that would automatically find, classify and index audio/video media files available on the Internet.

SUMMARY OF THE INVENTION

The inventive methodology is directed to methods and systems that substantially obviate one or more of the above and other problems associated with conventional techniques for generating indexed representation of information available on a computer network such as Internet.

In accordance with one aspect of the inventive technique, there is provided a computerized system. The inventive system includes a crawler operable to obtain multimedia files from a network; a multimedia processor operable to receive the multimedia files from the crawler and process the multimedia files and generate metadata corresponding to the multimedia files; a data mining module operable to extract relevant information from the generated metadata; and an indexer operable to index the multimedia files based on the relevant information.

In accordance with one aspect of the inventive technique, there is provided a method involving obtaining multimedia files from a network; processing the obtained multimedia files and generating metadata corresponding to the multimedia files; extracting relevant information from the generated metadata; and indexing the multimedia files based on the relevant information.

In accordance with one aspect of the inventive technique, there is provided a computerized system. The inventive system includes a crawler operable to obtain multimedia files from a network; a multimedia processor operable to process the obtained multimedia files and generate textual data corresponding to the multimedia files; and an indexer operable to index the multimedia files based on the generated textual data.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a specialized hardware, or combination of software and hardware.

Figure 1:
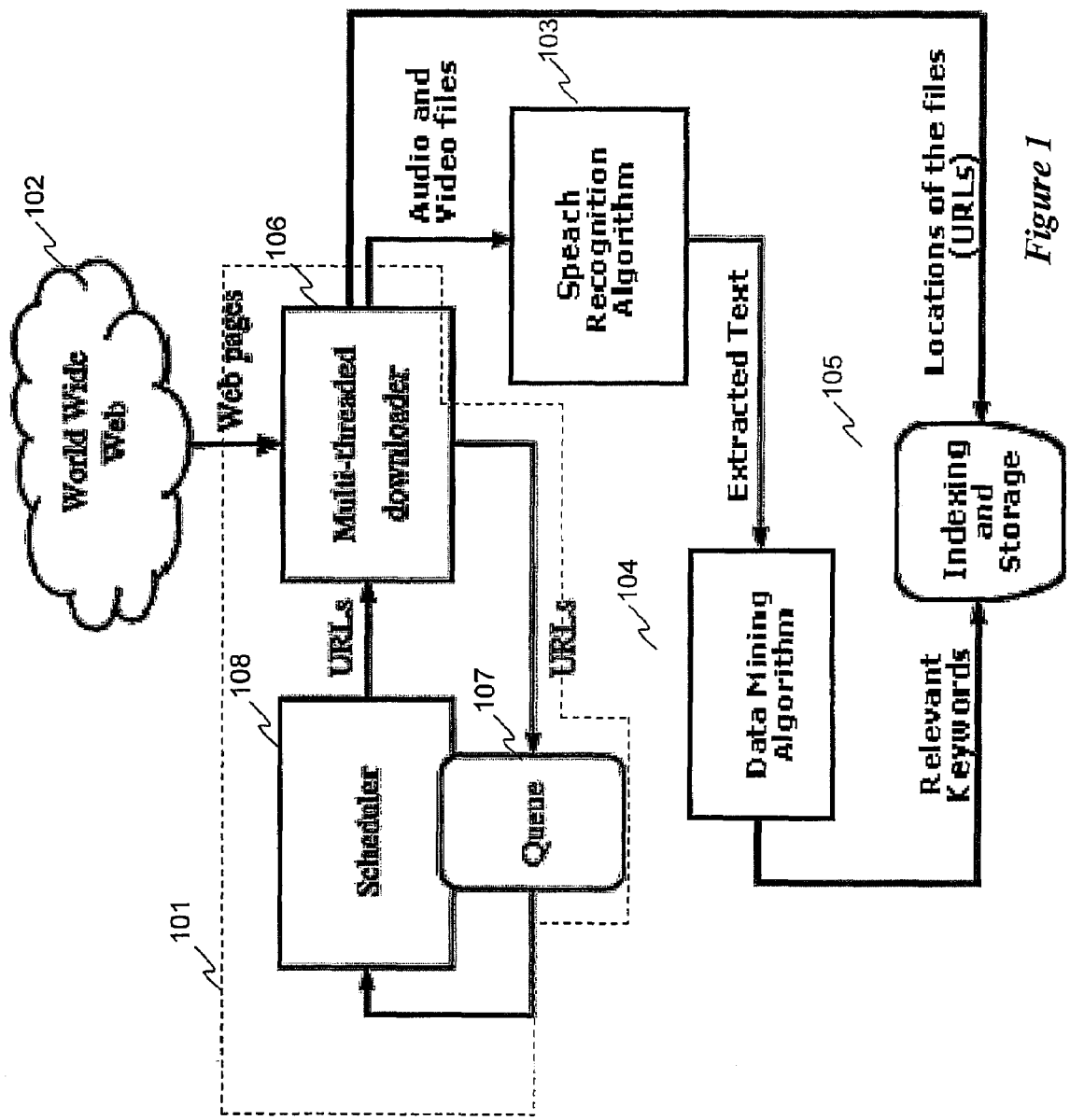
FIG. 1 shows an exemplary embodiment of an inventive web crawler for audio/video media files.

One aspect of the invention is a software web crawler module combined with several inventive algorithms, and a speech and/or sound recognition platform. With reference to FIG. 1, an embodiment of the invention may include four components: Web Crawler 101 operable to find audio and video files available on the Internet 102; Speech and/or Sound Recognition platform 103 operable to analyze found audio and video files and transform them into textual information; a module 104 executing text analysis algorithm, which mines the textual information generated by the Speech and/or Sound Recognition platform 103 by selecting words frequently appearing in the textual information and generating appropriate keywords based on the aforesaid frequently appearing word selections. The generated keywords describe the content of the audio/video file. The embodiment of the inventive system further includes indexation engine 105 operable to index the collected text by inserting the generated keywords and the associated web links pointing to the analyzed audio/video files into a database.

An embodiment of the invention may also include a user interface using which end-users are able to search and access indexed video and audio files and associated detailed descriptions of the audio/video content based on analyzed sound in the media files.

The unique invention concerns audio and video search and changes the current dynamics of searching for audio/video files based on human generated description of the file. Instead the inventive software crawls the web and automatically indexes and analyses audio/video sound to translate into text and create a set of keywords that can improve and enhance end-user ability to search and find files based on inventive indexation and analysis of all sound within the file translated into text.

The inventive technology can be used by search engines that enable users to find audio and video files not based on human generated description of that file, but on complete analysis of sound in each file on the web and indexation of that sound translated to text. (For Example: An existing search engine could come upon a website with a sound file described as "my favorite song" where the file is actually a "Christmas Song", and index that file as "my favorite song". The inventive software would analyze the sounds in the song to index the file as a "marry, Christmas, happy, new, year". This is accomplished using the inventive crawler's ability to crawl, index, analyze, and translate audio/video files into text.

Technical Details

In an embodiment of the invention, the inventive software resides on a server platform coupled to a network such as Internet. In an embodiment of the invention, the crawler 101 is implemented as a server side algorithm, which may be written in php, perl, cgi, etc. When the inventive crawler visits a website, it looks for audio/video files with all known audio/video extensions, which may include, without limitation, mp3, avi, wav, mpeg, etc. If at least one audio/video file is found, the crawler records the URL of the file and forwards this URL to the voice/sound recognition algorithm 103. Whereupon, the crawler 101 continues looking for more audio/video files and follows all available URLs on that website.

Figure 2:
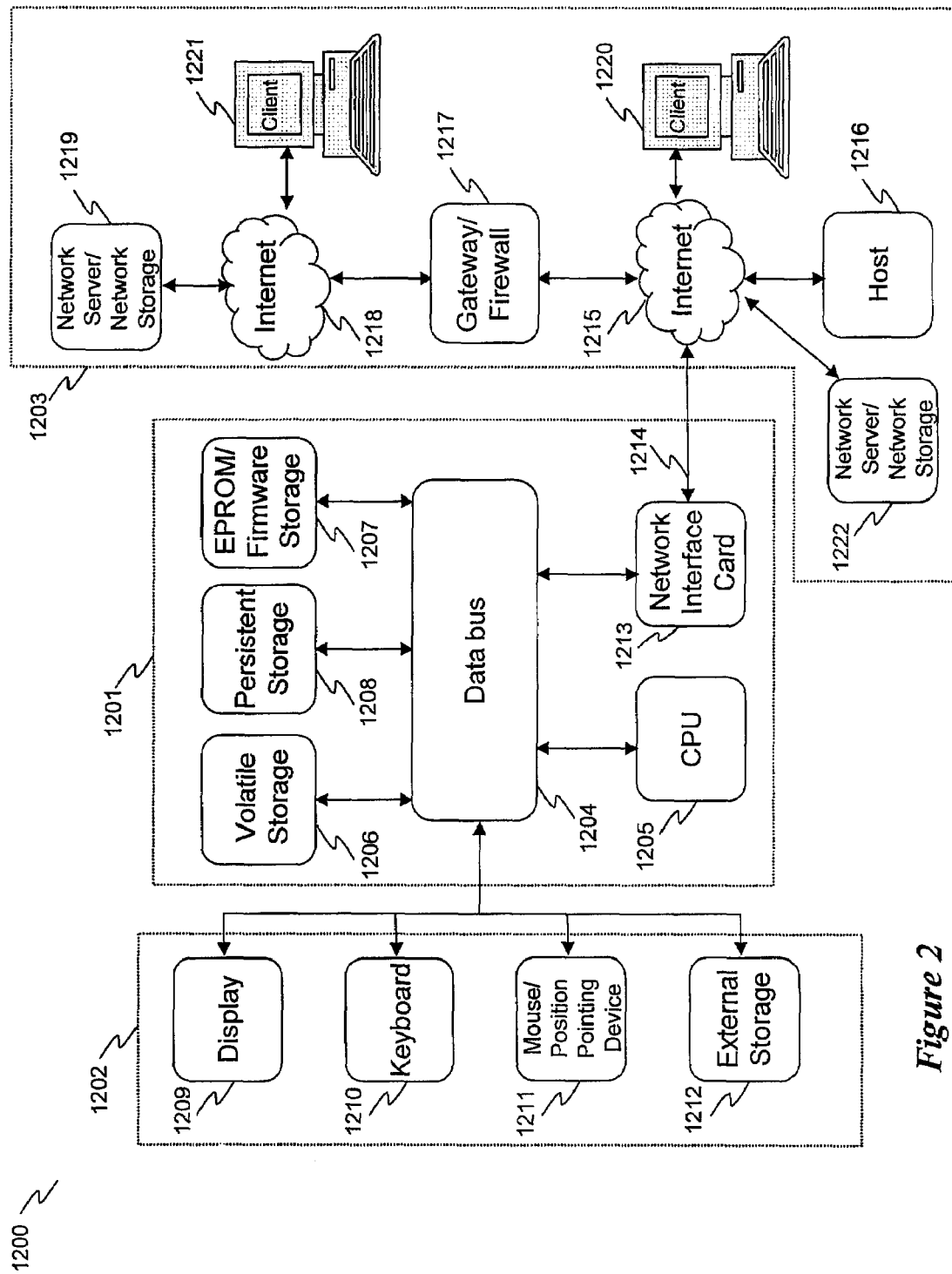
FIG. 2 illustrates an exemplary embodiment of a computer platform upon which the inventive system may be implemented.

In one specific embodiment of the invention, the web crawler 101 is implemented as a multi-threaded downloader 106 that resides on an internet server or set of servers. An exemplary implementation of a server platform that could host the aforesaid crawler 101 is illustrated in FIG. 2 and described in detail below. The crawler 101 operates to download web pages from the World Wide Web. In one implementation, the crawler recognizes the links on a downloaded page and places the recognized links in a queue 107. On the other hand, the scheduler 108 takes the urls from the queue 107 and sends them back to multi-threaded downloader 106. This process continues until the queue is empty, or the scheduler 108 is stopped, or stars over again.

In an embodiment of the inventive system, the multi-threaded downloader 106 also recognizes the links to audio/video files by one or more predetermined parameters. Such predetermined parameters may include, for example, file extensions, including, without limitation, .mov, .swf, .mp3, .mp4, .wav and the like. In addition to the file extensions, the downloader may rely on other parameters in recognizing audio/video files, such as presence of objects of certain type (s) on the page, the received headers, web page metadata, and the like. In an embodiment of the inventive system, the located files are downloaded or passed by reference, such as URL, to the speech recognition or other audio/video processing algorithm 103 for text or other attribute extraction. The inventive system may be based on any suitable speech recognition algorithm or audio/video processing algorithm well known to persons of skill in the art.

The module 103 implementing the voice/sound recognition algorithm may be written in c, c++, or any other suitable programming language and may be based on one or more multimedia processors. Upon the receipt of the URL from the crawler, the module 103 follows the URL to the target audio/video file, and transforms the file's content into textual information, descriptive of the content of the audio/video file, which is send to the module 104 implementing a data mining algorithm. In one embodiment of the invention, the module 103 detects spoken words appearing in the audio file or in a audio portion of the video file. Once the aforesaid spoken words are detected in the audio stream, they are converted into corresponding written words in the textual information stream.

In another embodiment of the invention, the voice/sound recognition algorithm is operable to generate a set of attributes corresponding to various properties of the input audio/video files. Specifically, the system analyzes the sounds appearing in the audio/video media files. The system compares the detected sounds with a set of pre-defined sounds. If upon such comparison, the system, for example, detects a ring tone or gun shot, the terms "ring tone" or "gun shot" will be associated with the target media file. The system may also detect certain styles of music, using the characteristic sounds or rhythms present in the target audio/video media files, such as rock n roll or waltz. After the detection, the appropriate keywords describing the music styles, such as "rock n roll" or "waltz" are associated with the respective media files.

The text extracted by the module 103 is passed to the Data Mining Algorithm 104. It should be appreciated that the inventive is not limited to any specific data mining algorithm and any such algorithm well known to persons of skill in the art may be used for implementing the module 104. The data mining algorithm, in turn, extracts relevant keywords from the extracted text.

In one embodiment of the inventive system, the data mining algorithm detects frequencies of various words in the received textual information and adds weights to each keyword that was generated by the voice/sound recognition algorithm. The data mining algorithm compiles a set of keywords for each audio/video media file. The set of keywords is send to the indexer module 105. As would be appreciated by persons of skill in the art, the invention is not limited to any specific data mining algorithm and any suitable implementation thereof may be utilized in the module 105.

In one embodiment of the invention, the indexer module 105 stores the generated set of keywords along with the URL of the analyzed audio/video media file in a database. It also optimizes the database for the most accurate and fast data retrieval. This can be achieved by applying any known indexing technique, such as database storage, file system storage, hashing and the like. The result of the inventive process is complete automatic indexation and analyzes of all audio/video files on the internet.

Exemplary Computer Platform

FIG. 2 is a block diagram that illustrates an embodiment of a computer/server system 1200 upon which an embodiment of the inventive methodology may be implemented. The system 1200 includes a computer/server platform 1201, peripheral devices 1202 and network resources 1203.

The computer platform 1201 may include a data bus 1204 or other communication mechanism for communicating information across and among various parts of the computer platform 1201, and a processor 1205 coupled with bus 1201 for processing information and performing other computational and control tasks. Computer platform 1201 also includes a volatile storage 1206, such as a random access memory (RAM) or other dynamic storage device, coupled to bus 1204 for storing various information as well as instructions to be executed by processor 1205. The volatile storage 1206 also may be used for storing temporary variables or other intermediate information during execution of instructions by processor 1205. Computer platform 1201 may further include a read only memory (ROM or EPROM) 1207 or other static storage device coupled to bus 1204 for storing static information and instructions for processor 1205, such as basic input-output system (BIOS), as well as various system configuration parameters. A persistent storage device 1208, such as a magnetic disk, optical disk, or solid-state flash memory device is provided and coupled to bus 1201 for storing information and instructions.

Computer platform 1201 may be coupled via bus 1204 to a display 1209, such as a cathode ray tube (CRT), plasma display, or a liquid crystal display (LCD), for displaying information to a system administrator or user of the computer platform 1201. An input device 1210, including alphanumeric and other keys, is coupled to bus 1201 for communicating information and command selections to processor 1205. Another type of user input device is cursor control device 1211, such as a mouse, a trackball, or cursor direction keys for communicating direction information and command selections to processor 1204 and for controlling cursor movement on display 1209. This input device typically has two degrees of freedom in two axes, a first axis (e.g., x) and a second axis (e.g., y), that allows the device to specify positions in a plane.

An external storage device 1212 may be connected to the computer platform 1201 via bus 1204 to provide an extra or removable storage capacity for the computer platform 1201. In an embodiment of the computer system 1200, the external removable storage device 1212 may be used to facilitate exchange of data with other computer systems.

The invention is related to the use of computer system 1200 for implementing the techniques described herein. In an embodiment, the inventive server 103 may reside on a machine such as computer platform 1201. In an embodiment, the location database 104 may also be deployed on a machine such as computer platform 1201. According to one embodiment of the invention, the techniques described herein are performed by computer system 1200 in response to processor 1205 executing one or more sequences of one or more instructions contained in the volatile memory 1206. Such instructions may be read into volatile memory 1206 from another computer-readable medium, such as persistent storage device 1208. Execution of the sequences of instructions contained in the volatile memory 1206 causes processor 1205 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1205 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1208. Volatile media includes dynamic memory, such as volatile storage 1206. Transmission media includes coaxial cables, copper wire and fiber optics, including the wires that comprise data bus 1204. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1205 for execution. For example, the instructions may initially be carried on a magnetic disk from a remote computer. Alternatively, a remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on the data bus 1204. The bus 1204 carries the data to the volatile storage 1206, from which processor 1205 retrieves and executes the instructions. The instructions received by the volatile memory 1206 may optionally be stored on persistent storage device 1208 either before or after execution by processor 1205. The instructions may also be downloaded into the computer platform 1201 via Internet using a variety of network data communication protocols well known in the art.

The computer platform 1201 also includes a communication interface, such as network interface card 1213 coupled to the data bus 1204. Communication interface 1213 provides a two-way data communication coupling to a network link 1214 that is connected to a local network 1215. For example, communication interface 1213 may be an integrated services digital network (ISDN) card or a modem to provide a data communication connection to a corresponding type of telephone line. As another example, communication interface 1213 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1213 sends and receives electrical, electromagnetic or optical signals that carry digital data streams representing various types of information.

Network link 1213 typically provides data communication through one or more networks to other network resources. For example, network link 1214 may provide a connection through local network 1215 to a host computer 1216, or a network storage/server 1217. Additionally or alternatively, the network link 1213 may connect through gateway/firewall 1217 to the wide-area or global network 1218, such as an Internet. Thus, the computer platform 1201 can access network resources located anywhere on the Internet 1218, such as a remote network storage/server 1219. On the other hand, the computer platform 1201 may also be accessed by clients located anywhere on the local area network 1215 and/or the Internet 1218. The network clients 1220 and 1221 may themselves be implemented based on the computer platform similar to the platform 1201.

Local network 1215 and the Internet 1218 both use electrical, electromagnetic or optical signals that carry digital data streams. The signals through the various networks and the signals on network link 1214 and through communication interface 1213, which carry the digital data to and from computer platform 1201, are exemplary forms of carrier waves transporting the information.

Computer platform 1201 can send messages and receive data, including program code, through the variety of network(s) including Internet 1218 and LAN 1215, network link 1214 and communication interface 1213. In the Internet example, when the system 1201 acts as a network server, it might transmit a requested code or data for an application program running on client(s) 1220 and/or 1221 through Internet 1218, gateway/firewall 1217, local area network 1215 and communication interface 1213. Similarly, it may receive code from other network resources.

The received code may be executed by processor 1205 as it is received, and/or stored in persistent or volatile storage devices 1208 and 1206, respectively, or other non-volatile storage for later execution. In this manner, computer system 1201 may obtain application code in the form of a carrier wave.

It should be noted that the present invention is not limited to any specific types of wireless or wired network protocols. The requisite network configuration may be achieved using a variety of known networking protocols.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized monetization system. It is intended that the specification and examples be considered as exemplary only, with a true scope and spirit of the invention being indicated by the following claims.

What is claimed is:

1. A computerized system comprising:
    a crawler obtaining multimedia files from a network, the crawler comprising:
        a multi-threaded downloader that downloads web pages;
        a queue storing links corresponding to the download web pages;
        a scheduler obtaining the stored links from the queue and passing the obtained links to the multi-threaded downloader, wherein the multi-threaded downloader downloads multiple multimedia files concurrently from said links;
    a multimedia processor receiving said multimedia files from the crawler and processing said multimedia files by translating speech in the multimedia files into a textual representation,
        wherein said multimedia processor determines sound effects in said multimedia files by comparing said sound effects in said multimedia files against a predetermined set of sounds, wherein generated metadata is determined by the comparison, and wherein said metadata comprises keywords identifying a type of said sound effects;
    a data mining module that extracts text information from the textual representation; and
    an indexer that indexes the multimedia files based on said keywords and said text information.

2. The computerized system of claim 1, wherein the multimedia processor is further operable to detect a type of music in the multimedia files.

3. The computerized system of claim 1, wherein the data mining algorithm:
    a. detects frequency of keywords in the generated metadata;
    b. adds weights to the keywords, and
    c. compiles the keywords for each multimedia file.

4. The computerized system of claim 1, wherein the multimedia files are audio files.

5. The computerized system of claim 1, wherein the multimedia files are video files.

6. A computer implemented method comprising:
    obtaining multimedia files from a network by utilizing a multi-threaded downloader that download multiple multimedia files concurrently from links acquired from downloaded web pages;
    processing, using a processor, the obtained multimedia files by translating speech in the multimedia files into a textual representation,
        wherein said processing further determines sound effects in said multimedia files by comparing said sound effects in said multimedia files against a predetermined set of sounds, wherein generated metadata is determined by the comparison, and wherein said metadata comprises keywords identifying a type of said sound effects;
    extracting text information from the textual representation, and;
    indexing the multimedia files based on said keywords and said text information.

7. The method of claim 6, wherein processing further comprises detecting a type of music in the multimedia files.

8. The method of claim 6, wherein extracting further comprises:
    a. detecting frequency of keywords in the generated metadata;
    b. adding weights to the keywords; and
    c. compiling the keywords for each multimedia file.

9. The computerized system of claim 1, wherein the multimedia files are audio files.

10. The computerized system of claim 1, wherein the multimedia files are video files.

* * * * *